(12) United States Patent
Kim

(10) Patent No.: US 9,004,579 B2
(45) Date of Patent: Apr. 14, 2015

(54) BAFFLE STRUCTURE OF OPEN CAR

(71) Applicant: Hyundai Motor Company, Seoul (KR)

(72) Inventor: Hyeyeon Kim, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/706,253

(22) Filed: Dec. 5, 2012

(65) Prior Publication Data

US 2014/0015282 A1    Jan. 16, 2014

(30) Foreign Application Priority Data

Jul. 16, 2012  (KR) .......................... 10-2012-0077394

(51) Int. Cl.
*B62D 25/08*    (2006.01)

(52) U.S. Cl.
CPC .............. *B62D 25/08* (2013.01); *B62D 25/087* (2013.01)

(58) Field of Classification Search
CPC .............................. B62D 25/08; B62D 25/087
USPC .......................... 296/193.02, 190.03; 280/756
See application file for complete search history.

(56) References Cited

U.S. PATENT DOCUMENTS

| | | | | |
|---|---|---|---|---|
| 5,788,322 A | * | 8/1998 | Wolf et al. | 296/181.4 |
| 7,481,476 B2 | * | 1/2009 | Heiss et al. | 296/24.43 |
| 8,360,472 B2 | * | 1/2013 | Froschle | 280/756 |

FOREIGN PATENT DOCUMENTS

| | | |
|---|---|---|
| EP | 0676316 | 10/1995 |
| JP | 1999-115662 A | 4/1999 |
| JP | 2005-186690 A | 7/2005 |
| KR | 10-2008-0037444 A | 4/2008 |

* cited by examiner

*Primary Examiner* — Glenn Dayoan
*Assistant Examiner* — Melissa A Black
(74) *Attorney, Agent, or Firm* — Morgan, Lewis & Bockius LLP

(57) ABSTRACT

A baffle structure of an open car that may be disposed in a traverse direction at a rear side of a seat of the open car to protect an occupant, may include a lower cross member that may be disposed along a lower floor panel of a vehicle body in the traverse direction and of which a cross-section thereof may be in a shape of pipe, an upper cross member that may be disposed in the traverse direction at a predetermined distance from the lower cross member and of which a cross-section thereof has quadrangle shape, and a column of which a lower end portion thereof may be connected to the lower cross member, an upper end thereof may be connected to the upper cross member, and a cross-section thereof has a quadrangle pipe shape.

7 Claims, 5 Drawing Sheets

BAFFLE STRUCTURE OF OPEN CAR

CROSS-REFERENCE TO RELATED APPLICATION

The present application claims priority to Korean Patent Application No. 10-2012-0077394, filed on Jul. 16, 2012, the entire contents of which is incorporated herein for all purposes by this reference.

BACKGROUND OF THE INVENTION

1. Field of the Invention

The present invention relates to a baffle structure of an open car. More particularly, the present invention relates to a baffle structure of an open car that is disposed in a width direction of a vehicle body to improve rigidity of the vehicle body.

2. Description of Related Art

An open car denotes a vehicle of which a roof is not there or the roof can be opened. A vehicle is designed to increase rigidity so as to protect an occupant when a vehicle is overturned, and for this a baffle is disposed therein.

The baffle forms a space in which a roll over protection system (ROPS) is mounted to reduce damage to the occupant when the open car is overturned, and is disposed in a width direction such as a P/Tray of a sedan to improve the rigidity of the vehicle body.

The ROPS is disposed at right/left sides of a vehicle, a space is necessary to house the ROPS, and several panels are used to form the space as a baffle.

Accordingly, as described above, several panels are used to increase the number of components, but overall rigidity and durability is deteriorated and it is insufficient to protect the occupant.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a baffle structure of an open car having advantages of increasing overall rigidity of a vehicle body, simplifying a fabrication process by reducing the number of components, reducing production cost, and improving overall durability so as to securely protect an occupant.

In an aspect of the present invention, a baffle structure of an open car that is disposed in a traverse direction at a rear side of a seat of the open car to protect an occupant may include a lower cross member that is disposed along a lower floor panel of a vehicle body in the traverse direction and of which a cross-section thereof is in a shape of pipe, an upper cross member that is disposed in the traverse direction at a predetermined distance from the lower cross member and of which a cross-section thereof may have quadrangle shape, and a column of which a lower end portion thereof is connected to the lower cross member, an upper end thereof is connected to the upper cross member, and a cross-section thereof may have a quadrangle pipe shape.

The lower cross member may include a first lower cross element that is connected to an upper portion of the lower floor panel, and a second lower cross element that is connected to a lower portion of the lower floor panel to form a quadrangle pipe shape with the first lower cross element.

The upper cross member may include a first upper cross element of which a lower portion thereof is connected to the column, and a second upper cross element that is connected to an upper end portion of the first upper cross element to close the upper end portion of the first upper cross element and that forms the quadrangle shape.

The baffle structure of the open car may further include a reinforcing member that is disposed inside the upper cross member and is connected to the first upper cross element and the second upper cross element, and where a mounting space is formed therein.

A mounting hole is formed in the first upper cross element to be connected to the mounting space of the reinforcing member so as to install a roll over protect system therein.

The column may include side columns that are disposed adjacent to a side panel of the open car and connected to the side panel along a shape of the side panel, and a central portion column that is disposed between the side columns.

The baffle structure of the open car may include a column reinforcement element that is connected to an inner side of the side columns to reinforce rigidity of the side columns.

The central portion column may include a first column element of which a side thereof is opened in the traverse direction of the vehicle body, and a second column element that is connected to the first column element to cover an opened part of the first column element.

The baffle structure of the open car may further include a member side element that is connected to both distal ends of the upper cross member, wherein the member side element is connected to a side panel of the vehicle body.

The baffle structure of the open car may further include a member reinforcing element that is connected along an inner side surface of the upper cross member.

The baffle structure of the open car may further include a reinforcing member that is disposed inside the upper cross member and is connected to upper portion and lower portion thereof, and where a mounting space is formed therein.

A mounting hole is formed in the upper cross member to be connected to the mounting space of the reinforcing member so as to install a roll over protect system therein.

The cross-sections of the lower cross member, the upper cross member, and the column may have a quadrangle shape.

As described above, a baffle structure of an open car according to an exemplary embodiment of the present invention increases overall rigidity of a vehicle body, simplifies a fabrication process by reducing the number of components, reduces production cost, and improves durability so as to protect an occupant.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
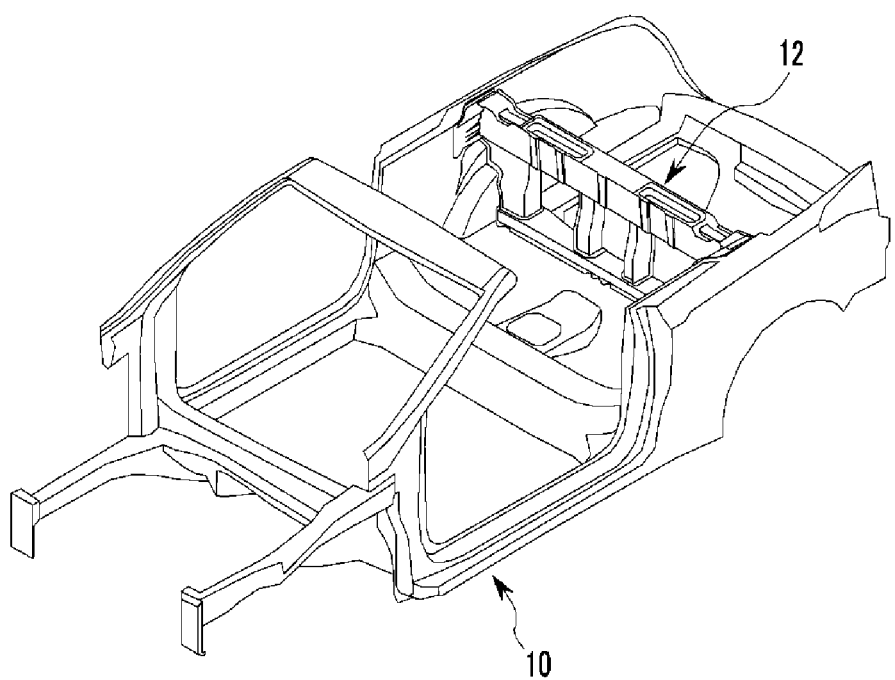
FIG. 1 is an overall perspective view of a vehicle to which a baffle structure of an open car is applied according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is an overall perspective view of a vehicle to which a baffle structure of an open car is applied according to an exemplary embodiment of the present invention.

Referring to FIG. 1, a baffle unit 12 is disposed in a vehicle body of an open car. The baffle unit 12 is disposed in a width direction of a vehicle body 10 at a rear side of a seat and a ROPS is mounted inside the baffle unit 12 to protect the head of an occupant when a vehicle is overturned.

A ROPS (roll over protect system) is a device for reducing damage to the occupant, and the detailed description thereof is widely known such that it will be omitted.

The baffle unit 12 is disposed in a width direction of the vehicle body 10 to improve overall rigidity of the vehicle, and has a high rigidity member structure to improve the durability of the vehicle.

Here, the member structure signifies that the cross-section thereof has a pipe structure of a polygon shape.

Figure 2:
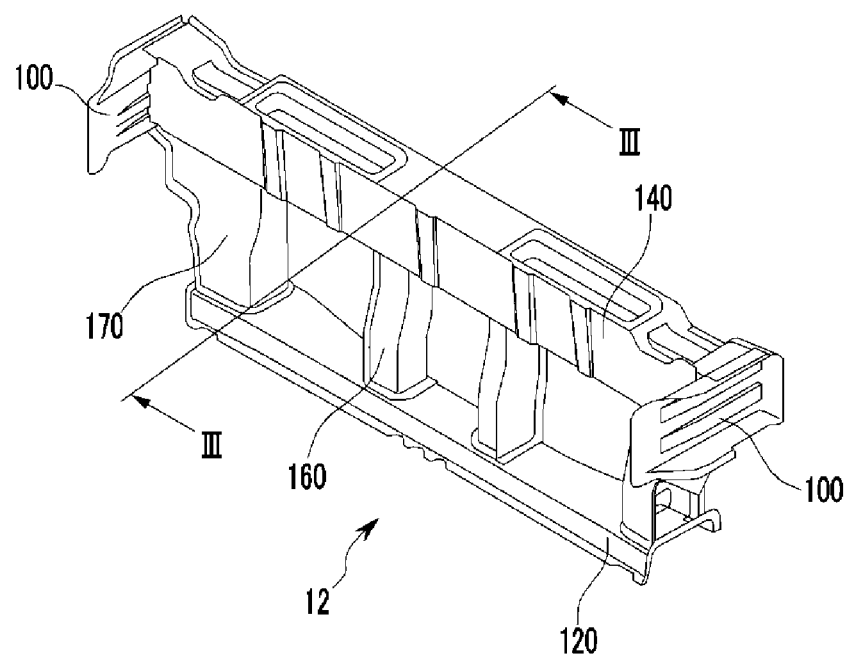
FIG. 2 is a perspective view of a baffle structure of an open car according to an exemplary embodiment of the present invention.

FIG. 2 is a perspective view of a baffle structure of an open car according to an exemplary embodiment of the present invention.

Referring to FIG. 2, the baffle unit 12 includes an upper cross member 140, a lower cross member 120, a side column 170, a central portion column 160, and a member side element 100.

The member side element 100 of which the cross-section thereof has a "U" or "⌐" shape is fixed on both sides of the upper cross member 140, and the member side element 100 is joined to an inner side of the vehicle body. In particular, the member side element 100 may be connected to a side panel 50 of the vehicle body Further, the side column 170 is formed along the inner side shape of the vehicle body to be joined to the inner side of the vehicle body.

Figure 3:
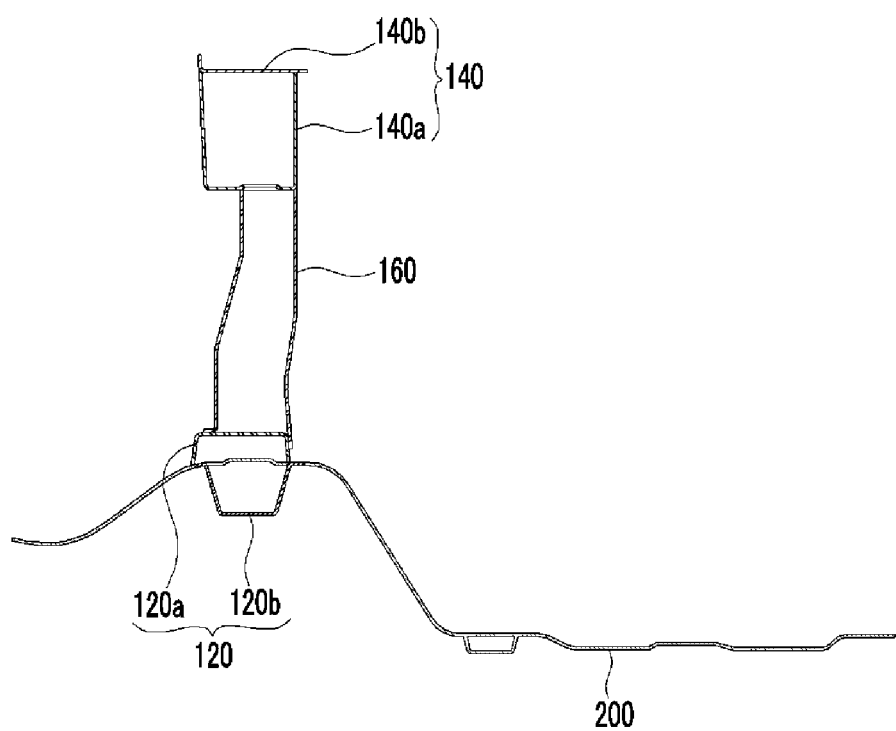
FIG. 3 is a cross-sectional view of a baffle structure of an open car along line III-III of FIG. 2.

FIG. 3 is a cross-sectional view of a baffle structure of an open car along line III-III of FIG. 2.

Referring to FIG. 3, the lower cross member 120 includes a first lower cross element 120a and a second lower cross element 120b.

The first lower cross element 120a is joined along the upper surface of the floor panel 200 of the vehicle body, and the second lower cross element 120b is joined to the lower surface of a floor panel 200.

The first lower cross element 120a is disposed to correspond to the second lower cross element 120b and the lower cross elements 120a/120b form a quadrangle shape pipe structure together.

As shown in drawings, the first lower cross element 120a and the second lower cross element 120b respectively have a "U" shape and are joined with each other to form a member structure with a "D" shape.

The upper cross member 140 includes a first upper cross element 140a and a second upper cross element 140b.

An upper portion of the first upper cross element 140a is opened to be disposed in a "U" shape, an upper end portion of the central portion column 160 is joined to the lower surface of the element 140a, and the first upper cross element 140a is joined to the second upper cross element 140b to cover the opened upper portion of the second upper cross element 140b.

As shown in drawings, the cross-section of the upper cross member 140, the lower cross member 120, and the central portion column 160 has a pipe structure of a quadrangle shape to improve overall rigidity of the vehicle.

Figure 4:
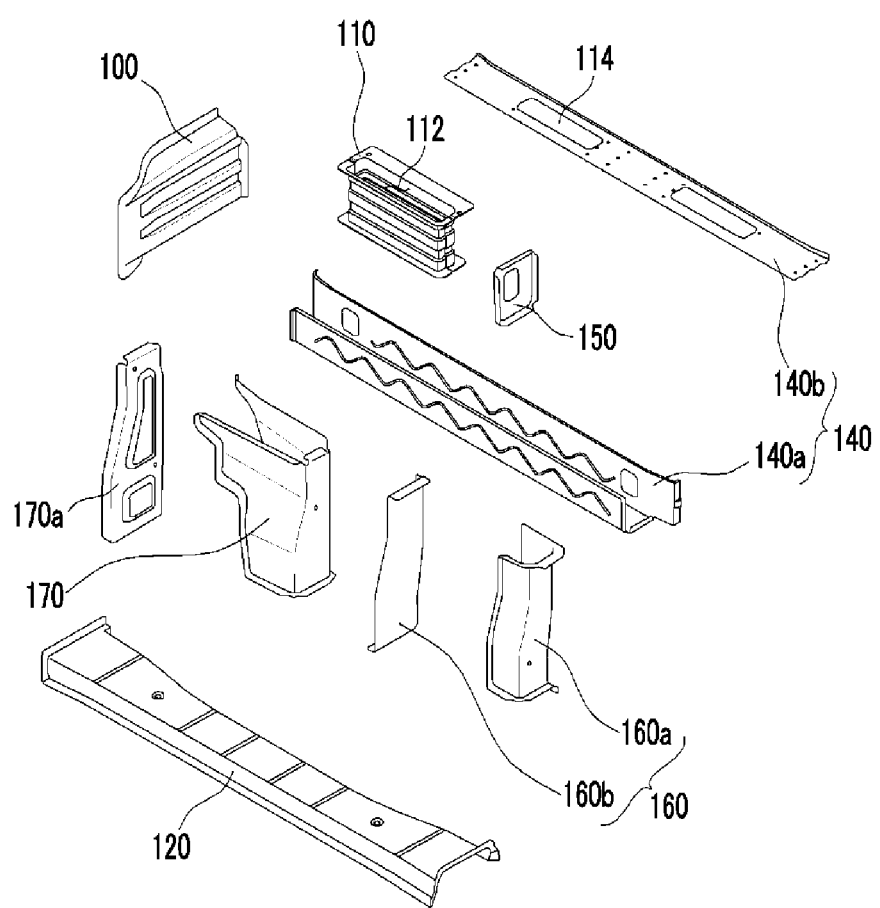
FIG. 4 is an exploded perspective view of a baffle structure of an open car according to an exemplary embodiment of the present invention.

FIG. 4 is an exploded perspective view of a baffle structure of an open car according to an exemplary embodiment of the present invention.

Referring to FIG. 4, a reinforcing member 110 is disposed inside the first upper cross element 140a, has a pipe structure that is disposed in a vertical direction, and has a mounting space therein.

The lower end surface of the reinforcing member 110 is joined to an inner side lower end surface of the first upper cross element 140a, and the upper end surface thereof is joined to a lower surface of the second upper cross element 140b.

Further, a mounting hole 114 is formed in the second upper cross element 140b to be connected to a mounting space 112 of the reinforcing member 100.

The ROPS is inserted in the mounting space 112 of the reinforcing member 110 through the mounting hole 114 of the second upper cross element 140b.

A member reinforcing member 150 is joined along an inner side surface of the upper cross member 140 to improve overall rigidity of the upper cross member 140.

As shown, the member reinforcing member 150 has a quadrangle plate shape.

The part corresponding to the vehicle body in the side column 170 is formed to follow the outside surface of the vehicle body, and a column reinforcing member 170a is disposed in the inner side space thereof. The column reinforcing member 170a is continuously joined to the inner side surface of the side column 170.

Further, the upper end portion of the column reinforcing member 170a is joined to the lower end surface of the first upper cross element 140a and the lower end portion thereof is joined to the upper end surface of the lower cross member 120.

The central portion column 160 includes a first column element 160a and a second column element 160b, and as shown, the cross-section of the first column element 160a has "⊏" or "U" shape, the second column element 160b has a plate shape, and the first column element 160a is joined to the second column element 160b to form a member structure having a "D" or "☐" shape.

Figure 5:
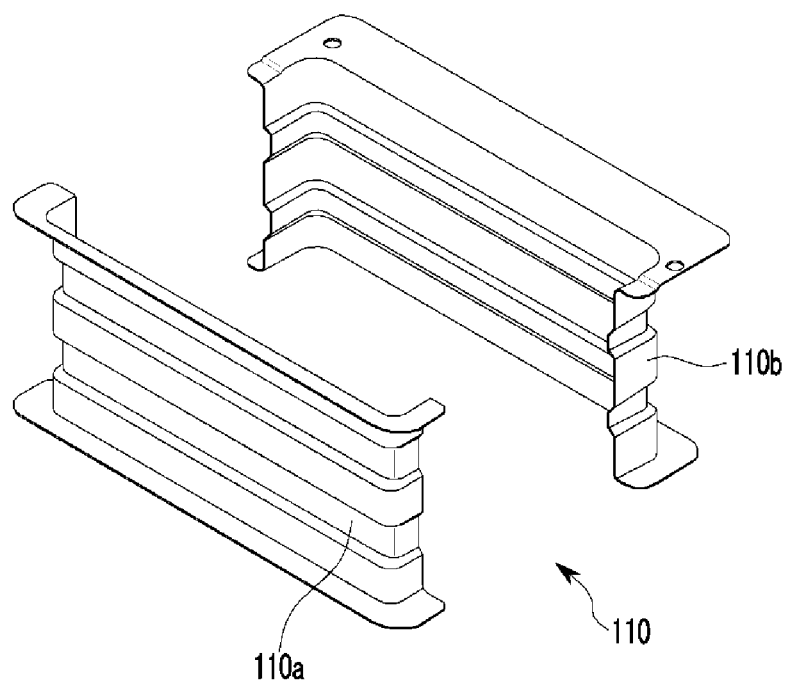
FIG. 5 is an exploded perspective view a reinforcing member in a baffle structure of an open car according to an exemplary embodiment of the present invention.

FIG. 5 is an exploded perspective view of a reinforcing member in a baffle structure of an open car according to an exemplary embodiment of the present invention.

Referring to FIG. 5, the reinforcing member 110 is formed by joining the first reinforcing member 110a to the second reinforcing member 110b, and the first reinforcing member 110a and the second reinforcing member 110b have the "⊏" or "U" shape and are symmetrical to each other.

As described above, a mounting space is formed inside the reinforcing member 110 to house the ROPS.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A baffle structure of an open car that is disposed in a traverse direction at a rear side of a seat of the open car to protect an occupant, comprising:
   a lower cross member that is disposed along a lower floor panel of a vehicle body in the traverse direction and of which a cross-section thereof is in a shape of pipe;
   an upper cross member that is disposed in the traverse direction at a predetermined distance from the lower cross member and of which a cross-section thereof has quadrangle shape; and
   a column of which a lower end portion thereof is connected to the lower cross member, an upper end thereof is connected to the upper cross member, and a cross-section thereof has a quadrangle pipe shape;
   wherein the lower cross member includes:
      a first lower cross element that is directly connected to an upper portion of the lower floor panel; and
      a second lower cross element that is directly connected to a lower portion of the lower floor panel to form a quadrangle pipe shape with the first lower cross element;
   wherein the upper cross member includes:
      a first upper cross element of which a lower portion thereof is connected to the column; and
      a second upper cross element that is mounted above the first upper cross element and is connected to an upper end portion of the first upper cross element to close the upper end portion of the first upper cross element and that forms the quadrangle shape
   a reinforcing member that is disposed inside the first and second upper cross members and is connected to the first upper cross element and the second upper cross element, and where a hollow mounting space is formed therein; and
   wherein a mounting hole is formed in the upper cross element to communicate with the hollow mounting space of the reinforcing member so as to install a roll over protect system therethrough.

2. The baffle structure of the open car of claim 1, wherein the column includes:
   side columns that are disposed adjacent to a side panel of the open car and connected to the side panel along a shape of the side panel; and
   a central portion column that is disposed between the side columns.

3. The baffle structure of the open car of claim 2, further comprising a column reinforcement element that is connected to an inner side of the side columns to reinforce rigidity of the side columns.

4. The baffle structure of the open car of claim 2, wherein the central portion column includes:
   a first column element of which a side thereof is opened in the traverse direction of the vehicle body; and
   a second column element that is connected to the first column element to cover an opened part of the first column element.

5. The baffle structure of the open car of claim 1, further comprising a member side element that is connected to both distal ends of the upper cross member, wherein the member side element is connected to a side panel of the vehicle body.

6. The baffle structure of the open car of claim 1, further comprising a member reinforcing element that is connected along an inner side surface of the upper cross member.

7. The baffle structure of the open car of claim 1, wherein the cross-sections of the lower cross member, the upper cross member, and the column have a quadrangle shape.

* * * * *